Aug. 2, 1960 E. E. JOHNSTON 2,947,287
PRESSURE BALANCE CONTROL VALVE
Filed Aug. 29, 1957 2 Sheets-Sheet 1

EVERETT E. JOHNSTON
INVENTOR.

BY
ATTORNEY

Aug. 2, 1960  E. E. JOHNSTON  2,947,287
PRESSURE BALANCE CONTROL VALVE
Filed Aug. 29, 1957  2 Sheets-Sheet 2

EVERETT E. JOHNSTON
INVENTOR.

BY *Herbert J. Brown*

ATTORNEY

United States Patent Office 2,947,287
Patented Aug. 2, 1960

2,947,287
PRESSURE BALANCE CONTROL VALVE

Everett E. Johnston, Fort Worth, Tex., assignor to Sta-Parts, Inc., Fort Worth, Tex., a corporation of Texas Filed Aug. 29, 1957, Ser. No. 681,041

6 Claims. (Cl. 121—45)

This invention relates generally to control valves and more specifically to a valve of this type employed for automatic machine tool operation.

The primary object of this invention is to provide a fluid pressure operated control valve which has a unique operating structure to deliver pressure on demand to operate a fluid power device.

Another object is to provide a control valve for operating a reciprocating fluid power device in reciprocating sequence automatically such as an actuating cylinder.

And a further object of this invention is to provide a fluid control valve having a novel ball and pin combination to permit opening and closing of the power outlet port of this valve.

And yet another object is to provide a fluid control valve having a hollow sleeve to be moved axially by a fluid piston to provide the opening and closing of the ball and pin structure of the invention.

And a still further object is to provide a control valve which is comprised of three axially aligned housing sections which cooperate to form internal passageways to provide the operating functions of this valve.

And another object is to provide a control valve which can direct very large operating pressures with the application of a very small controlling force to the valve.

These and other objects and advantages will be apparent from an examination of the following specification and drawings in which.

Figure 1:
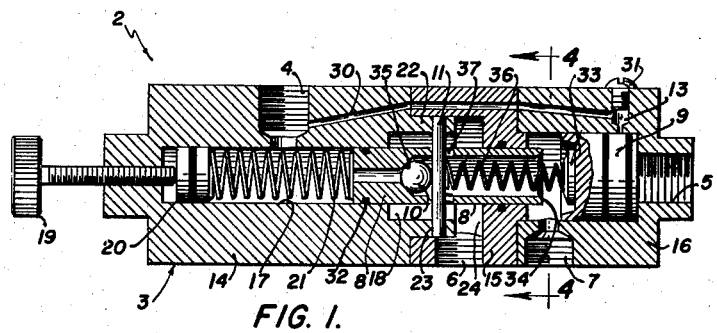
Figure 1 is a longitudinal cross-sectional view of the fluid control valve of this invention in its exhaust position.
Figure 2:
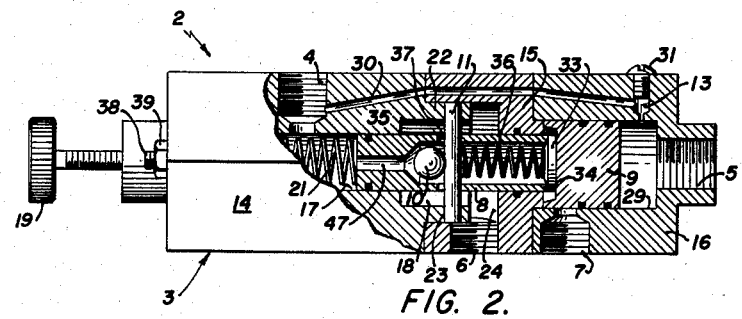
Figure 2 is a fragmentary cross-sectional and elevational view of the device of Figure 1 showing this valve in its pressure directing position.
Figure 4:
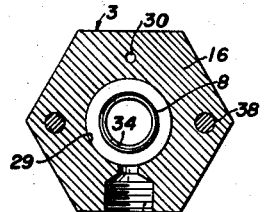
Figure 4 is a cross-sectional view taken along lines 4—4 of Figure 1.
Figure 5:
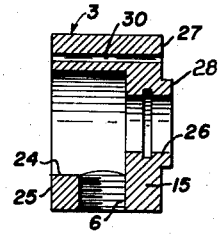
Figure 5 is a detail view of the center housing member of Figures 1 and 2.
Figure 3:
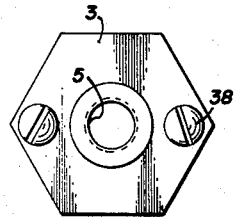
Figure 3 is a front end elevational view.
Figure 6:
Figure 6 is a detail view in fragmentary cross-section of the center sleeve member of Figures 1 and 2.

Referring to the characters of reference on the drawing, it will be observed that the control valve of this invention, indicated generally at 2, includes a hexagonal housing 3 having an inlet port 4, a control port 5, a directing port 6, and an exhaust port 7, which ports are controlled by the internal parts of a spring loaded sleeve piston 8, a spring loaded large piston 9, a ball 10, a stop in the form of pin 11, and a locking port 13.

The housing 3 is made up from hexagonal bar stock or similar material and comprises three separate sections, identified as a front section 14, a middle section 15, and a rear section 16. The front section 14 includes the inlet port 4 which opens into an axial chamber 17 in which sleeve piston 8 is partially located, and a counterbore chamber 18 which is concentric with chamber 17 and opens to the internal end of section 14. The extreme front end of front section 14 is threaded to receive a manual adjustment screw 19 which abuts the end of plug 20 and imparts axial adjustment to compression spring 21 in chamber 17. A boss 22 surrounds counterbore chamber 18 and contains radially aligned holes 23 to receive pin 11. The middle section 15 includes a counterbore 24 which snugly engages boss 22 until its front face 25 abuts section 14 in fluid tight relation. A small bore 26 in this section aligns with axial bore 17 and is adapted to be slideably engaged by sleeve piston 8 at assembly. The rear face 27 of section 15 abuts rear section 16 in fluid tight relation and a small ridge 28 of this section engages the bore 29 of section 16 to insure alignment of these two sections. Rear section 16 includes the previously mentioned control port 5 which opens into the bore 29 which comprises the cylinder for piston 9, and section 16 also includes the small threaded locking port 13 which opens radially from bore 29 to the locking bypass channel 30 which runs through each of the sections 14—16 and opens into port 4. For construction purposes, port 13 is threaded to the outside of housing 3 and then sealed by screw 31.

Each operating part within valve 2 includes at least one O ring 32 to prevent pressure leaks, and piston 9 includes a semi-conical shaped removable valve 33 which is adapted to engage the valve seat 34 at the rear end of sleeve piston 8. The ball 10 is adapted to engage the internal valve seat 35 of sleeve piston 8 in sealing relation whenever ball 10 is engaged by pin 11 due to the action of spring 21 against piston 8. Pin 11 acts as a stationary base against which one end of compression spring 36 abuts. The other end of spring 36 engages valve 33 to force piston 9 rearward when the pressure in bore 29 behind the piston drops below a predetermined value. A pair of aligned slotted ports 37 in sleeve piston 8 determine the amount and direction of movement of this piston relative to stationary pin 11. The three sections 14—16 are held together by through bolts 38 and their attached nuts 39.

Figure 8:
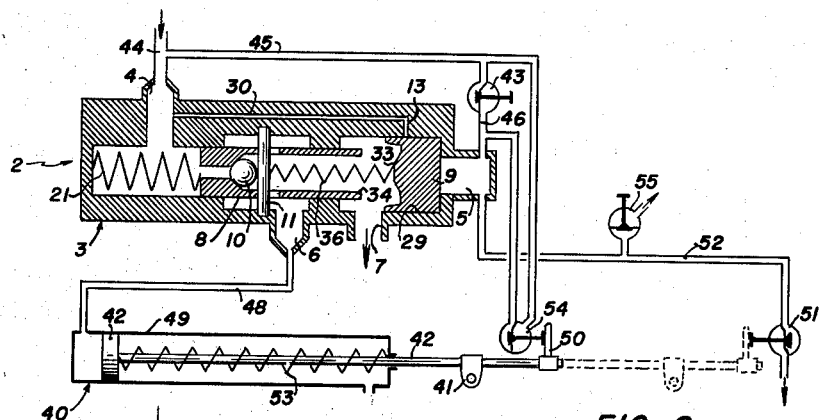
Figure 8 is a schematic drawing showing the operating cycle of the fluid control valve as employed in a power cylinder circuit, with the cylinder piston shown in its retracted position.
Figure 9:
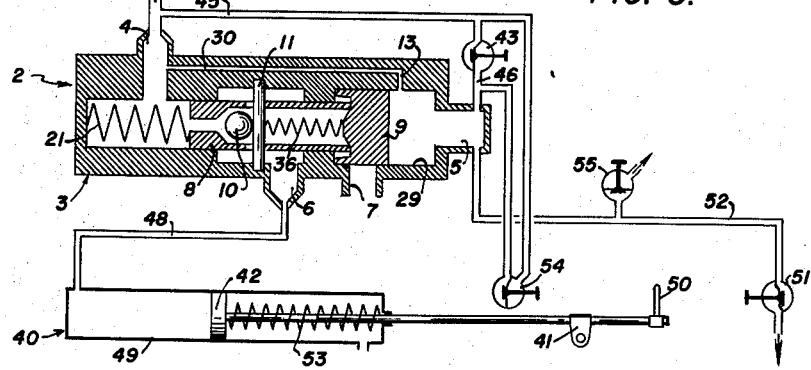
Figure 9 is a drawing of the device of Figure 8 showing the piston in an extended position.
Figure 7:
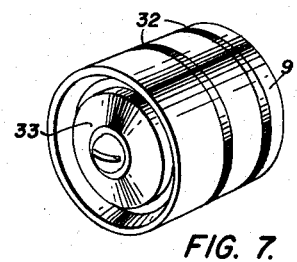
Figure 7 is a perspective view of the large piston of this invention detached from the valve shown in Figure 1.

The arrangement shown in Figures 8 and 9 is one embodiment of the control valve 2 in a fluid circuit for controlling the operation of a fluid device such as power jack 40 employed to extend and retract a machine tool (not shown) which is to be attached to lug 41 of piston 42 for reciprocal movement therewith. Once the circuit is placed in operation by opening the manual control valve 43, fluid from inlet pressure line 44 is directed through lines 45 and 46 into port 5 and thence into bore 29 to move piston 9 forward until it uncovers locking port 13 allowing the pressure from the inlet line 44 through channel 30 to enter bore 29 and keep supplying pressure to the back side of piston 8 even though the manual valve 43 may have been released. The pressure in bore 29 continues to be maintained until valve 33 of piston 9 is firmly seated against valve seat 34 and until exhaust port 7 is closed off, and as the pressure continues sleeve piston 8 will be moved forward off ball 10 thus allowing pressure from inlet port 4 to enter through axial hole 47 to the interior of sleeve piston 8 and then radially out through slots 37 and into counterbore 18 and through counterbore 24 and out directing port 6 and thence through line 48 and into cylinder 49 of power jack 40. This action pressurizes the cylinder 49 and moves piston 42 in its extending direction until its actuator arm 50 strikes the normally closed valve 51 to open it and exhaust the pressure from line 52 to relieve the pressure in the counterbore 29 faster than channel 30 can maintain it. Springs 21 and 36 then take over and are able to overcome the fluid pressure and return the sleeve piston 8 and the piston 9 respectively to their initial positions. When this occurs, the spring 53 in cylinder 49 returns piston 42 to its initial position and in so doing forces the fluid back through line 48, port 6, sleeve 8 and out to exhaust through port 7 (Fig. 8). The complete apparatus is then ready to repeat the operating cycle which will begin as soon as lug 50 fully depresses the automatic starting valve 54. A manually operated return valve 55 is included in line 52 to provide selective manual operation if desired and also provide a safety feature in case any difficulty is encountered in the automatic operation.

The invention is not limited to the construction herein shown and described, but may be made in various ways within the scope of the appended claims.

What is claimed is:

1. In a control circuit for automatically cycling and operating a reciprocating fluid jack from a fluid control valve; a fluid jack having a piston, said piston including valve depressing means thereon, a master fluid control valve connected in operating relation with said jack, a starting valve and a reversing valve in operating relation with said master valve and also in operating alignment with said valve depressing means, a fluid passage means within said master control valve to supply fluid pressure to extend said jack upon actuation of said starting valve, means to retract said jack upon actuation of said reversing valve, said fluid passage means comprising a housing, a spring loaded sleeve moving in said housing in response to pressure, a spring loaded piston in said housing adapted to move against its spring pressure and to move said sleeve against its spring pressure in response to fluid pressure behind said piston, said starting valve when actuated supplying fluid pressure behind said piston.

2. In a control circuit for automatically cycling and operating a reciprocating fluid jack from a fluid control valve; a fluid jack having a piston, said piston including valve depressing means thereon, a master fluid control valve connected in operating relation with said jack, a starting valve and a reversing valve in operating relation with said master valve and also in operating alignment with said valve depressing means, a fluid passage means within said master control valve to supply fluid pressure to extend said jack upon actuation of said starting valve, means to retract said jack upon actuation of said reversing valve, said fluid passage means comprising a housing, a spring loaded sleeve moving in said housing in response to pressure, a spring loaded piston in said housing adapted to move against its spring pressure and to move said sleeve against its spring pressure in response to fluid pressure behind said piston, said starting valve when actuated supplying fluid pressure behind said piston, a valve seat in said sleeve, a ball adapted to open and close against said seat, and a stop within said sleeve, said sleeve adapted to move in a direction to close said ball simultaneously against said stop and valve seat to shut off the fluid passage through said control valve.

3. A control circuit for automatically operating a fluid device from a fluid pressure source, comprising: a fluid device having a movable member, a master fluid control valve having a housing connected in operating relation to said device, a fluid pressure source, a fluid passage through said master valve from said source to said device, a remote valve for opening said passage, and a second remote valve for closing said passage, said member including means for actuating said remote valves, an axially slideable sleeve within said housing, said sleeve including peripheral slots and including a valve seat in said fluid passage, a stationary pin in said housing and passing through said sleeve slots to permit relative movement of said sleeve to said pin, a ball inside said sleeve and positioned between said pin and valve seat whereby axial movement of said sleeve in one direction will cause said seat to engage said ball while forcing it against said pin to thus close said passage, and whereby movement in said other direction will open said passage and means within said master valve to cause said other direction movement when said first remote valve is opened.

4. A pressure balance control valve for directing a very large fluid pressure to a fluid operated device by the application of a very small force to the valve, comprising: a housing, a series of pressure cavities in said housing including an inlet, directing and control cavity, an axially movable hollow sleeve extending into all said cavities, an axial inlet hole at one end of said sleeve, an exhaust valve seat at the outer end of said sleeve, an axially movable piston adapted for limited movement in the same cavity into which said valve seat end of said sleeve extends, a valve on the back side of said piston in alignment with said valve seat, a valve means including a stationary member in said sleeve and in alignment with said inlet hole, an inlet cavity spring in said inlet cavity in operational relation with said sleeve and acting to normally cause said valve means to close said inlet hole, a second spring between said stationary member and said piston to normally prevent said piston valve from closing said sleeve valve seat, an inlet pressure supply connected to said inlet cavity, and means to direct a small pressure from said supply to the back side of said piston to cause said piston to move axially in said control cavity until said piston valve engages and closes said valve seat and moves said sleeve against the pressure of said inlet spring until said inlet hole has moved away from said valve means to permit said pressure to reach the interior of said sleeve, a directing port on said housing in communication with the interior of said sleeve through said directing cavity, a by-pass pressure line from said inlet supply to said control cavity to hold said piston in a position of engagement with said sleeve as long as a balanced pressure is maintained on the front of said piston, and means to quickly release said balanced pressure and permit said sleeve and piston to return to their initial positions under the urging of said springs.

5. A pressure balance control valve for directing a very large fluid pressure by the application of a small force to the valve, comprising: a housing, an inlet, a directing, and a control cavity in said housing; an inlet pressure supply port connected to said inlet cavity, a directing port connected to said directing cavity and a control port and an exhaust port both connected to said control cavity; an axially movable sleeve extending in all said cavities, communication means from said inlet port to said directing port and additional communication means from said directing port to said exhaust port, one valve means to normally close off said communication means to said directing port, and a second valve means to normally open said additional communication means; and means to supply a small pressure to said second valve means to simultaneously close said additional communication means and open said communication means to direct said inlet pressure to said directing port.

6. A pressure balance control valve as in claim 5 characterized by the inclusion of by-pass means for said inlet port to said control port to automatically maintain a sufficient pressure balance to hold said second valve means in the last named position until the pressure in said control port is released quickly to the atmosphere, and means to release said control port pressure quickly.

References Cited in the file of this patent

UNITED STATES PATENTS

| | | |
|---|---|---|
| 1,363,333 | Lower | Dec. 28, 1920 |
| 1,779,586 | Chalker | Oct. 28, 1930 |
| 1,998,873 | Kingsbury | Apr. 23, 1935 |
| 2,769,298 | Jones | Nov. 6, 1956 |
| 2,803,110 | Chrittenden | Aug. 20, 1957 |